US012739595B2

(12) United States Patent
Im

(10) Patent No.: US 12,739,595 B2
(45) Date of Patent: Sep. 15, 2026

(54) METHOD FOR TRANSMITTING REQUEST TO EXTERNAL DEVICE, AND ELECTRONIC DEVICE SUPPORTING SAME

(71) Applicant: SAMSUNG ELECTRONICS CO., LTD., Suwon-si (KR)

(72) Inventor: Byungjai Im, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 769 days.

(21) Appl. No.: 18/083,254

(22) Filed: Dec. 16, 2022

(65) Prior Publication Data

US 2023/0118461 A1 Apr. 20, 2023

Related U.S. Application Data

(63) Continuation of application No. PCT/KR2021/006606, filed on May 27, 2021.

(30) Foreign Application Priority Data

Jun. 18, 2020 (KR) ........................ 10-2020-0074392

(51) Int. Cl.
*H04W 4/02* (2018.01)
*H04W 64/00* (2009.01)

(52) U.S. Cl.
CPC ......... *H04W 4/025* (2013.01); *H04W 64/003* (2013.01)

(58) Field of Classification Search
CPC .... G01S 19/17; G01S 2205/06; G01S 5/0009; G01S 5/0027; G08B 21/10;
(Continued)

(56) References Cited

U.S. PATENT DOCUMENTS 6,662,025 B1 * 12/2003 Bond ................ H04M 1/72436 455/150.1
9,203,252 B2 12/2015 Robison
(Continued)

FOREIGN PATENT DOCUMENTS

JP 2006-325174 A 11/2006
JP 4451893 B2 4/2010
(Continued)

OTHER PUBLICATIONS

Communication issued Mar. 14, 2025 by the Korean Intellectual Property Office in Korean Patent Application No. 10-2020-0074392.

*Primary Examiner* — Lester G Kincaid
(74) *Attorney, Agent, or Firm* — Sughrue Mion, PLLC

(57) ABSTRACT

An electronic device includes: a wireless communication module; and a processor operatively connected to the wireless communication module and configured to: establish interworking between the electronic device and at least one first external device using the wireless communication module; receive a message including geographical alert information from a second external device using the wireless communication module; obtain first location information from the message; request location information of the first external device from the first external device using the wireless communication module; obtain second location information of the first external device in response to the request; determine whether the second location information corresponds to the first location information; based on determining that the second location information corresponds to the first location information, generate data indicating a request for checking the message via the electronic device; and transmit, using the wireless communication module, the data to the first external device.

19 Claims, 9 Drawing Sheets

(58) Field of Classification Search
CPC ..... G08B 25/016; G08B 27/00; H04L 51/222; H04L 67/52; H04L 67/535; H04M 1/72421; H04M 1/72424; H04M 1/72436; H04M 1/72433; H04M 1/72457; H04W 4/025; H04W 64/003
See application file for complete search history.

(56) References Cited

U.S. PATENT DOCUMENTS

| | | | | |
|---|---|---|---|---|
| 9,609,479 | B1* | 3/2017 | Bostick | H04W 4/12 |
| 9,949,068 | B2 | 4/2018 | Jain et al. | |
| 10,186,133 | B2* | 1/2019 | Jang | H04W 4/90 |
| 10,417,893 | B2 | 9/2019 | Myers et al. | |
| 2003/0034878 | A1* | 2/2003 | Hull | H04M 19/04 340/5.61 |
| 2004/0019521 | A1* | 1/2004 | Birmingham | G06Q 30/02 705/14.57 |
| 2010/0114854 | A1* | 5/2010 | Lee | G06F 16/9537 707/707 |
| 2013/0339304 | A1 | 12/2013 | Lee et al. | |
| 2015/0243150 | A1 | 8/2015 | Kang et al. | |
| 2015/0334544 | A1 | 11/2015 | Park | |
| 2017/0148306 | A1* | 5/2017 | Wolfson | H04W 4/02 |
| 2017/0208564 | A1 | 7/2017 | Lee et al. | |
| 2017/0332421 | A1 | 11/2017 | Sternberg et al. | |
| 2018/0152840 | A1 | 5/2018 | Nagasaki | |
| 2018/0199179 | A1* | 7/2018 | Rauner | G08B 25/10 |
| 2018/0235015 | A1 | 8/2018 | Musgrove et al. | |
| 2018/0310158 | A1 | 10/2018 | Kimura et al. | |
| 2019/0019401 | A1 | 1/2019 | Han et al. | |
| 2019/0119401 | A1 | 4/2019 | Moyo et al. | |
| 2020/0082706 | A1 | 3/2020 | Barber | |
| 2020/0118661 | A1* | 4/2020 | Jordan | G16H 20/10 |
| 2021/0250727 | A1* | 8/2021 | Lei | H04M 1/72457 |
| 2022/0141637 | A1* | 5/2022 | Pellegrini | H04W 4/90 455/404.1 |

FOREIGN PATENT DOCUMENTS

| | | | |
|---|---|---|---|
| JP | 6915262 | B2 | 8/2021 |
| KR | 10-1079963 | B1 | 11/2011 |
| KR | 10-2013-0141138 | A | 12/2013 |
| KR | 10-1582266 | B1 | 1/2016 |
| KR | 10-2017-0032304 | A | 3/2017 |
| KR | 10-1805533 | B1 | 12/2017 |
| KR | 10-2018-0097304 | A | 8/2018 |
| KR | 10-2019-0051978 | A | 5/2019 |
| KR | 10-2156902 | B1 | 9/2020 |
| KR | 10-2188782 | B1 | 12/2020 |
| KR | 10-2021-0050715 | A | 5/2021 |
| KR | 10-2256683 | B1 | 5/2021 |
| KR | 10-2021-0115182 | A | 9/2021 |
| KR | 10-2329984 | B1 | 11/2021 |

* cited by examiner

METHOD FOR TRANSMITTING REQUEST TO EXTERNAL DEVICE, AND ELECTRONIC DEVICE SUPPORTING SAME

CROSS-REFERENCE TO RELATED APPLICATIONS

This application is a bypass continuation application of International Patent Application No. PCT/KR2021/006606, filed on May 27, 2021, which claims priority to Korean Patent Application No. 10-2020-0074392, filed on Jun. 18, 2020 in the Korean Intellectual Property Office, the disclosures of which are incorporated by reference herein in their entireties.

BACKGROUND

1. Field

The disclosure relates to a method of transmitting a request to an external device, and an electronic device supporting the same.

2. Description of Related Art

A communication function of an electronic device may function as a core interface that supports transmission or reception of information resources without restrictions of time and space associated with an operating environment. For example, the electronic device may provide, based on the communication function, emergency disaster services such as alerts, defined by the Wireless Emergency Alert (WEA) 3.0 standard.

An electronic device may receive an alert message broadcasted from a base station in a region where an emergency occurs, and may output the alert message via various interfaces (e.g., a display and/or a speaker). However, the WEA 3.0 specification does not enable an electronic device to share the received alert message with an external device, and thus the alert message received by the electronic device may lose the purpose of its function (e.g., emergency alert) depending on whether a user operates (or carries) the electronic device. For example, in an environment where the electronic device interacts with an external device (e.g., interworking between "paired" devices), if only the external device operates (or if a user carries only the external device and not the electronic device), the alert message that the electronic device receives may not be intuitively recognized by the user.

SUMMARY

Provided are a method of transmitting a request to an external device so as to support a user who operates the external device to check an alert message received by an electronic device in an environment where the electronic device interworks with the external device, and an electronic device supporting the same.

In accordance with an aspect of the disclosure, an electronic device may include a wireless communication module and a processor operatively connected to the wireless communication module.

According to an aspect of the disclosure, an electronic device includes: a wireless communication module; and a processor operatively connected to the wireless communication module and configured to: establish interworking between the electronic device and at least one first external device using the wireless communication module; receive a message including geographical alert information from a second external device using the wireless communication module; obtain first location information from the message; request location information of the at least one first external device from the at least one first external device using the wireless communication module; obtain second location information of the at least one first external device in response to the request; determine whether the second location information corresponds to the first location information; based on determining that the second location information corresponds to the first location information, generate data indicating a request for checking the message via the electronic device; and transmit, using the wireless communication module, the data to at least one of the at least one first external device.

The processor may be further configured to, based on the message being unchecked via the electronic device during a designated period of time from the reception of the message, obtain the first location information from the message.

The electronic device may further include a sensor module, and the processor may be further configured to: monitor a signal or data output from the sensor module during the designated period of time; and based on the signal or the data not indicating at least one of a user input, a user grip, and an approach of an object with respect to the electronic device, determine that the message is unchecked via the electronic device.

The electronic device may further include a sensor module, and the processor may be further configured to: monitor a signal or data output from the sensor module during the designated period of time; and based on the signal or the data not indicating a movement of the electronic device, determine that the message is unchecked via the electronic device.

The first location information may include name information of a region related to the geographical alert information, the second location information may include name information of a region in which the at least one first external device is located, and the processor may be configured to determine that the second location information corresponds to the first location information based on the name information of the region included in the first location information and the name information of the region included in the second location information at least partially matching.

The first location information may include GPS coordinate information related to the geographical alert information, the second location information may include GPS coordinate information associated with a location of the at least one first external device, and the processor may be further configured to determine that the second location information corresponds to the first location information based on the GPS coordinate information included in the second location information falling within a range of radius designated based on the GPS coordinate information included in the first location information.

The at least one first external device may include a plurality of first external devices, and the processor may be further configured to: determine a group of at least one data transmission target candidate that provides the second location information corresponding to the first location information among the plurality of first external devices, and determine, based on a designated priority order, the at least one first external device to which the data is to be transmitted in the group of at least one data transmission target candidate.

The processor may be further configured to: obtain operation information associated with the group of at least one data transmission target candidate from a third external device using the wireless communication module; and determine, based on the operation information, the at least one first external device to which the data is to be transmitted to be one of: a group of a designated number of candidates arranged in order of high total frequency of operation, a group of a designated number of candidates arranged in order of latest operation, a group of a designated number of candidates arranged in order of high usable power, or a group of a designated number of candidates arranged in order of latest registration with the electronic device based on designated account information.

The processor may be further configured to: obtain operation information associated with the group of at least one data transmission target candidate from a third external device using the wireless communication module; and determine, based on the operation information, the at least one first external device to which the data is to be transmitted is determined to be one of a group of at least one candidate of a type that is capable of being worn on a user body, or a group of at least one candidate of a type that supports operation of a speaker.

The processor may be further configured to: detect whether the message has been checked via the electronic device, after transmitting the data; and based on detecting that the message has been checked via the electronic device, request deletion of the data from the at least one first external device to which the data has been transmitted.

The processor may be further configured to generate the data using at least one of text, a video, a still image, a pictogram, a symbol, and a sound indicating the request for checking the message via the electronic device.

The processor may be further configured to, based on determining that the second location information does not correspond to the first location information, request the location information of the at least one first external device from the at least one first external device at designated cycles.

According to an aspect of the disclosure, a method of transmitting, by an electronic device, a request to an external device, includes: establishing, using a wireless communication module of the electronic device, interworking between the electronic device and at least one first external device; receiving a message including geographical alert information from a second external device using the wireless communication module; obtaining first location information from the message; requesting location information of the at least one first external device from the at least one first external device using the wireless communication module; obtaining second location information of the at least one first external device in response to the request; determining whether the second location information corresponds to the first location information; based on determining that the second location information corresponds to the first location information, generating data indicating a request for checking the message via the electronic device; and transmitting the data to at least one of the at least one first external device using the wireless communication module.

The first location information may include name information of a region related to the geographical alert information, the second location information may include name information of a region in which the at least one first external device is located, and the determining whether the second location information corresponds to the first location information may include, based on the name information of the region included in the first location information and the name information of the region included in the second location information at least partially matching, determining that the second location information corresponds to the first location information.

The first location information may include GPS coordinate information related to the geographical alert information, the second location information may include GPS coordinate information associated with a location of the at least one first external device, and the determining whether the second location information corresponds to the first location information may include, based on the GPS coordinate information included in the second location information falling within a range of radius designated based on the GPS coordinate information included in the first location information, determining that the second location information corresponds to the first location information.

The generating data indicating a request for checking the message via the electronic device may include generating the data using at least one of text, a video, a still image, a pictogram, a symbol, and a sound indicating the request for checking the message via the electronic device.

The at least one first external device may include a plurality of first external devices, and the method may further include: determining a group of at least one data transmission target candidate that provides the second location information corresponding to the first location information among the plurality of first external devices, and determining, based on a designated priority order, the at least one first external device to which the data is to be transmitted in the group of at least one data transmission target candidate.

The method may further include obtaining, using the wireless communication module, operation information associated with the group of at least one data transmission target candidate from a third external device, and the determining the at least one first external device to which the data is to be transmitted may include determining, based on the operation information, the at least one first external device to which the data is to be transmitted to be one of a group of a designated number of candidates arranged in order of high total frequency of operation, a group of a designated number of candidates arranged in order of latest operation, a group of a designated number of candidates arranged in order of high usable power, or a group of a designated number of candidates arranged in order of latest registration with the electronic device based on designated account information.

The method may further include obtaining, using the wireless communication module, operation information associated with the group of at least one data transmission target candidate from a third external device, and the determining the at least one first external device to which the data is to be transmitted may include determining, based on the operation information, the at least one first external device to which the data is to be transmitted to be one of: a group of at least one candidate of a type that is capable of being worn on a user body, or a group of at least one candidate of a type that supports operation of a speaker.

The method may further include: detecting whether the message has been checked via the electronic device, after the transmitting the data; and based on detecting that the message has been checked via the electronic device, requesting deletion of the data from the at least one first external device to which the data has been transmitted.

According to one more embodiments, there may be provided a platform that supports a user who operates an external device to check an alert message received by an electronic device in an environment where the electronic device interworks with the external device.

According to one or more embodiments, by supporting the user who operates the external device to check the alert message received by the electronic device, user experience associated with the alert message may be enhanced.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
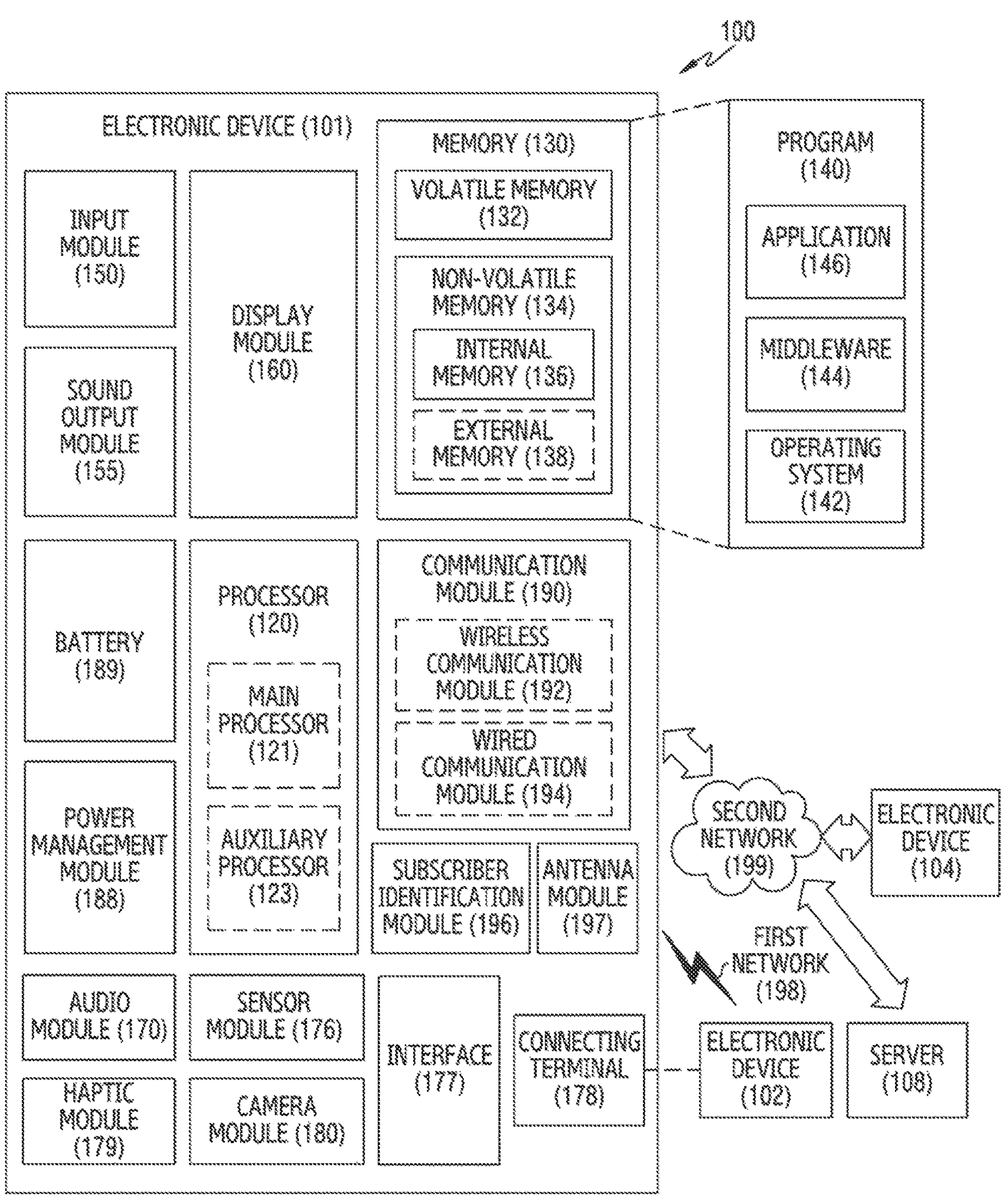
FIG. 1 is a diagram illustrating an electronic device in a network environment, according to various embodiments.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. In association with the descriptions of drawings, like reference numerals may be assigned to like or corresponding elements.

FIG. 1 is a diagram illustrating an electronic device in a network environment according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, a 4G network, and/or next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
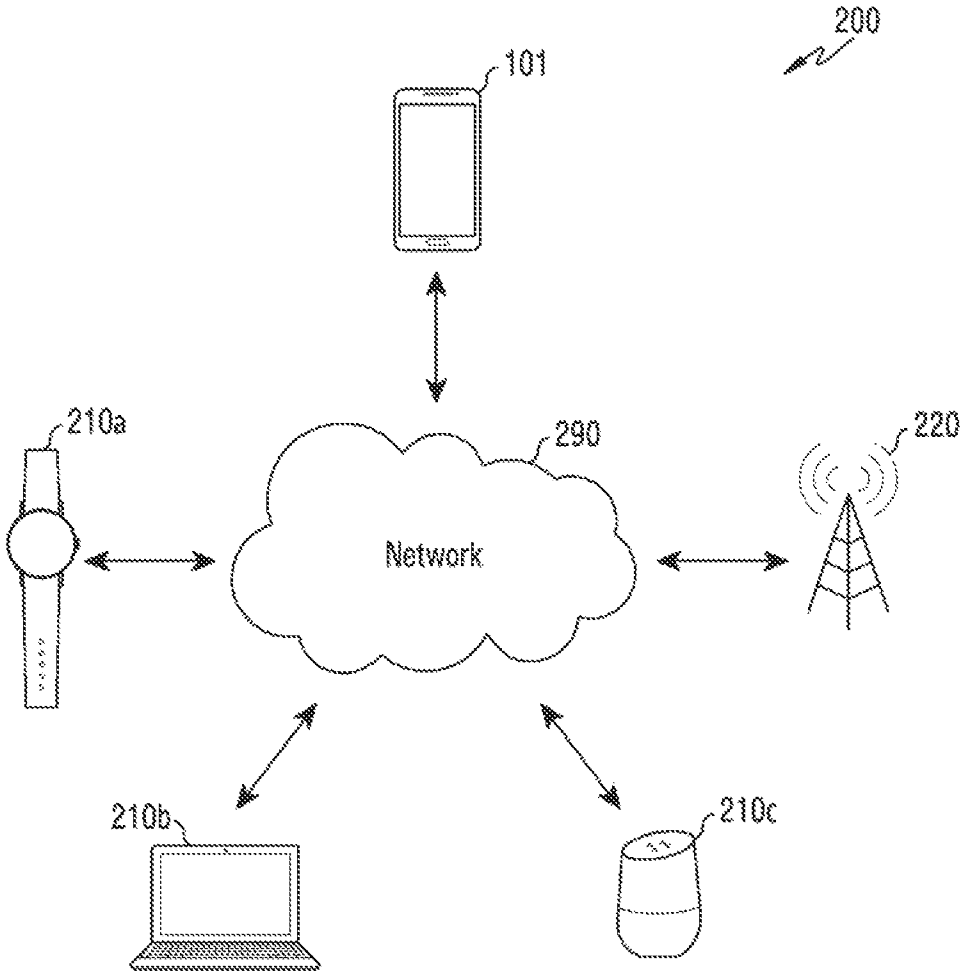
FIG. 2 is a diagram illustrating an operating environment of an electronic device, according to an embodiment.
Figure 3:
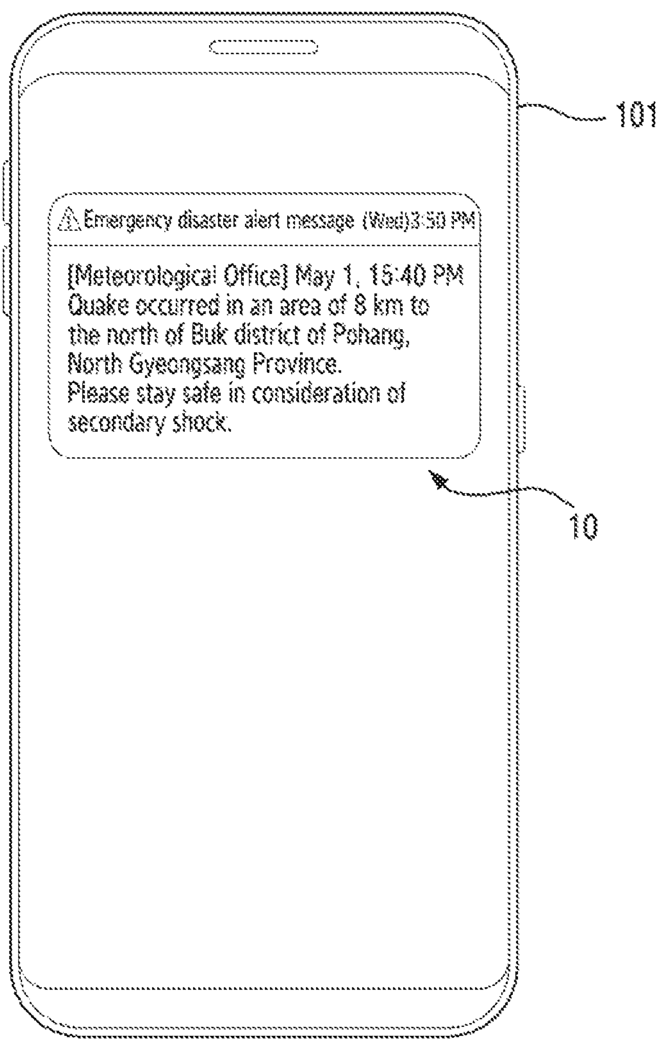
FIG. 3 is a diagram illustrating reception of a message by an electronic device, according to an embodiment.

FIG. 2 is a diagram illustrating an operating environment 200 of an electronic device according to an embodiment, and FIG. 3 is a diagram illustrating reception of a message by an electronic device according to an embodiment.

Referring to FIG. 2, the operating environment 200 of the electronic device 101 according to an embodiment may include at least one first external device **210*a* 210*b*, and/or 210*c* and a second external device 220 which interwork with the electronic device 101 based on a network 290. According to various embodiment, in the operating environment 200 of the electronic device 101, at least one of the above-described elements may be omitted, or at least one other element may be additionally included. For example, in the operating environment 200 of the electronic device 101, at least one of a server (e.g., a cell broadcast message service (CBS) server) for supporting the electronic device 101 to operate an emergency disaster service and a server (e.g., call and message continuity (CMC) server) for supporting interworking between the electronic device 101 and at least one first external device 210*a*, 210*b*, and/or 210*c*** may be further included.

According to an embodiment, based on access to the network 290 (e.g., the short-range wireless communication network 198 of FIG. 1) using a wireless communication module (e.g., the wireless communication module 192 of FIG. 1), the electronic device 101 may establish interworking (or pairing) with the at least one first external device **210*a*, 210*b*, and/or 210*c*. For example, based on a short-range communication protocol by at least one of Bluetooth (BT), Bluetooth low energy (BLE), wireless fidelity (Wife), Wifi-direct, wireless gigabit alliance (WiGig), ultra-wide-band (UWB), and Zigbee, the electronic device 101 may discover at least one adjacent first external device 210*a*, 210*b*, and/or 210*c*, and may establish interworking with the at least one first external device 210*a*, 210*b*, and/or 210*c*** selected based on a user input.

According to various embodiments, interworking between the electronic device 101 and the at least one first external device **210*a*, 210*b*, and/or 210*c* may include a service (e.g., one number service) that synchronizes function operation associated with at least one of a call and a message by unifying the electronic device 101 and the at least one first external device 210***a*, 210*b*, and/or 210*c* using a single number. Alternatively, the interworking between the electronic device 101 and the at least one first external electronic device 210*a*, 210*b*, and/or 210*c* may include a service that synchronizes function operation of an application (e.g., a music application and/or a gallery application) with at least one first external device 210*a*, 210*b*, and/or 210*c*. Alternatively, the interworking between the electronic device 101 and the at least one first external electronic device 210*a*, 210*b*, and/or 210*c* may include a service (e.g., screen mirroring service) that synchronizes a screen that the electronic device 101 outputs with at least one first external device 210*a*, 210*b*, and/or 210*c*. Alternatively, the interworking between the electronic device 101 and the at least one first external electronic device 210*a*, 210*b*, and/or 210*c* may include a service that connects the electronic device 101 and at least one first external device 210*a*, 210*b*, and/or 210*c* via an Internet of Things system.

According to an embodiment, the at least one first external device 210*a*, 210*b*, and/or 210*c* may include the same type of devices as the electronic device 101 or different types of devices from the electronic device 101. For example, the at least one first external device 210*a*, 210*b*, and/or 210*c* may include at least one of a portable communication device (e.g., a smartphone), a wearable device (e.g., a smart watch, a head mounted display device, smart glasses, and/or a wrist mounted smart band; e.g. device 210*a* as depicted), a computer device (e.g., a notebook and/or tablet; e.g. device 210*b* as depicted), an Internet of things device (e.g., an artificial intelligence speaker and/or a smart TV; e.g. device 210*c* as depicted), and an audio video navigation (ABN) device in a car.

Referring to FIGS. 2 and 3, the electronic device 101 may receive an alert message 10 from the second external device 220 based on access to the network 290 (e.g., the long-distance wireless communication network 199) using the wireless communication module 192. For example, the electronic device 101 may receive the alert message 10 produced from a CBS server from the second external device 220 including at least one of an access point device and a base station device. According to an embodiment, the alert message 10 may include geographical alert information related to public safety, and may include, for example, at least one of disaster type information, disaster occurrence time information, and disaster occurrence location information in the body of the alert message 10.

According to an embodiment, in response to reception of the alert message 10, the electronic device 101 (or the processor 120 of FIG. 1) may output the alert message 10 based on a designated interface. For example, the electronic device 101 may output at least one of an image and text that express the alert message 10 in a visual manner using a display (e.g., the display module 160 of FIG. 1). According to various embodiments, at least one of the image and the text may be displayed via at least one of a popup window, a widget application, and a message application. As another example, the electronic device 101 may output a sound that expresses the alert message 10 sonically using a speaker (e.g., the audio module 170 of FIG. 1). As another example, the electronic device 101 may output a designated pattern of vibration that expresses the alert message 10 in a tactile manner using a vibration output device (e.g., the haptic module 179 of FIG. 1). According to various embodiments, the electronic device 101 may output the alert message 10 via a combination of two or more of the image, text, sound, and vibration.

Hereinafter, various embodiments of the electronic device 101 described with reference to drawings may be performed according to control by the processor 120 that electrically or operatively connected to the wireless communication module 192 of the electronic device 101. Alternatively, the electronic device 101 may be embodied independently from the processor 120, and may further include a sensor hub processor capable of autonomously substituting for the function of the processor 120 in the state in which the electronic device 101 is in an inactive state (or sleep state or low-power state), and various operations of the electronic device 101 may be performed according to control by the sensor hub-processor. Hereinafter, various functional operations of the electronic device 101 performed according to control by the processor 120 will be described as an example.

Figure 4:
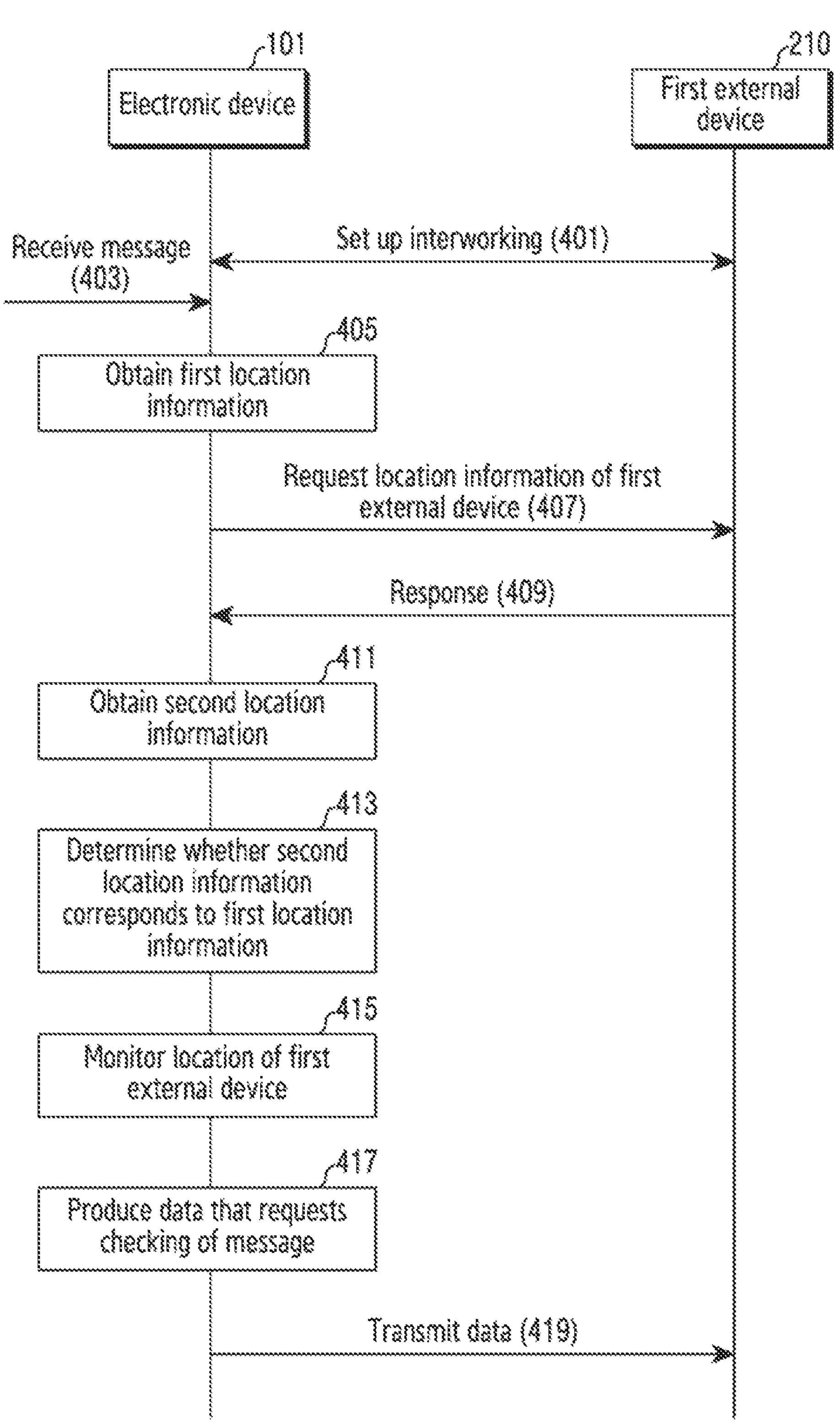
FIG. 4 is a flowchart illustrating operations performed between an electronic device and a first external device, according to an embodiment.
Figure 5:
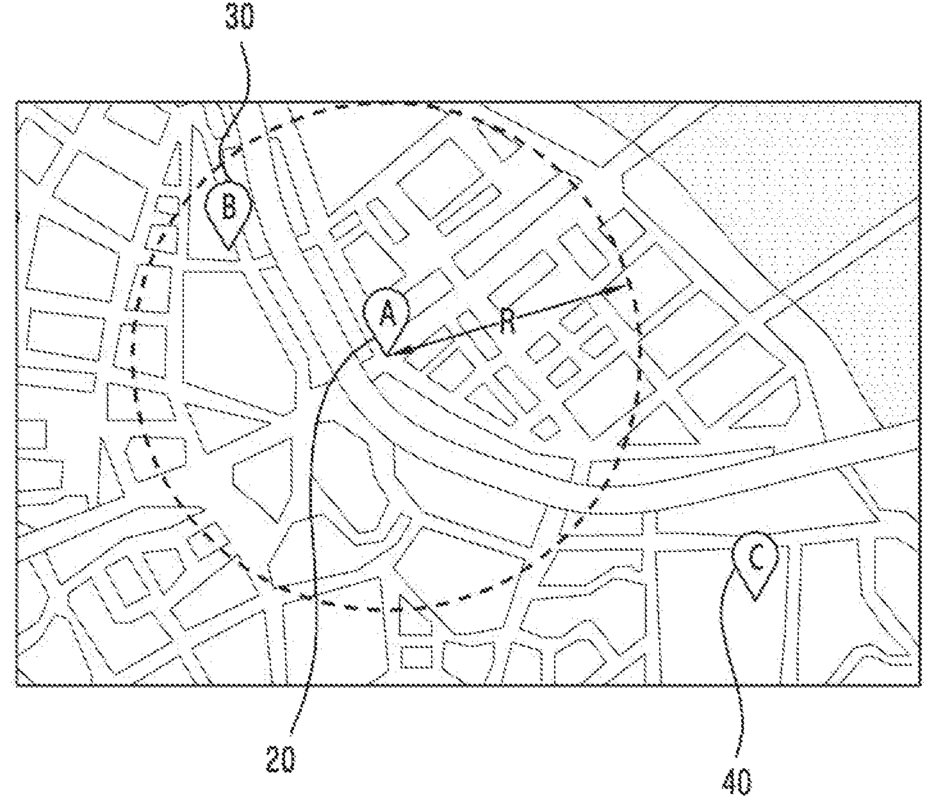
FIG. 5 is a diagram illustrating determination whether first location information and second location information, obtained by an electronic device, correspond to each other, according to an embodiment.

FIG. 4 is a flowchart illustrating operations performed between an electronic device and a first external device according to an embodiment, and FIG. 5 is a diagram illustrating determination whether first location information and second location information, obtained by an electronic device, correspond to each other according to an embodiment.

Referring to FIG. 4, in operation 401, a processor (e.g., the processor 120 of FIG. 1) of the electronic device 101 may establish interworking between the electronic device 101 and at least one first external device 210. For example, the processor 120 may discover at least one adjacent first external device 210 using a wireless communication module (e.g., the wireless communication module 192 of FIG. 1), and may establish interworking with at least one first external device 210 selected by a user input. According to various embodiments, in the operation of establishing interworking with the at least one first external device 210, the processor 120 may register, with the electronic device 101 by using user account information, the at least one first external device 210 with which interworking has been established. In this instance, the operating environment (the operating environment 200 of FIG. 2) of the electronic device 101 may further include a server (E.g., SAMSUNG account server) (e.g., a third external device) for performing, based on the account information, integrated management of the electronic device 101 and the at least one first external device 210.

In operation 403, the processor 120 may receive a message (e.g., the alert message 10 of FIG. 3) including geographical alert information (e.g., disaster type information, disaster occurrence time information, and/or disaster occurrence location information) using the wireless communication module 192. In association with the above, if an emergency disaster situation related to public safety occurs in a predetermined geographical area, a CBS server that supports an emergency disaster service may produce a message for notifying of the emergency disaster situation. According to an embodiment, if the location information of the electronic device 101 corresponds to a corresponding geographical area, the processor 120 may receive a message produced by the CBS server using the wireless communication module 192 from a second external device (e.g., the second external device 220 of FIG. 2, an access point, or a base station) located within the geographical area.

In operation 405, the processor 120 may obtain first location information in response to the reception of the message. Operation 405 may be selectively executed. For example, if the message is unchecked by a user, or a checking of the message by a user is not detected, during a designated period of time from the reception of the message, the processor 120 may obtain disaster occurrence location information included in the body of the message as the first location information. In association with the same, the processor 120 may monitor a signal or data output by at least one of a touch sensor, a gyro sensor, an acceleration sensor, a grip sensor, and an approximate sensor included in a sensor module (e.g., the sensor module 176 of FIG. 1) of the electronic device 101 during the designated period of time from the reception of the message. According to an embodiment, during the designated period of time, if a signal or data output by at least one of the above-described sensors does not indicate a user input, a user grip, and an approach of an object (e.g., a body part of a user) with respect to the electronic device 101, or does not indicate a movement of the electronic device 101, the processor 120 may determine that the message is not checked by the user during the designated period of time. According to another embodiment, if a message application is not performed in the foreground state during the designated period of time, the processor 120 may determine that the message has not been checked by the user. According to various embodiments, the first location information may include at least one of name information (e.g., a city, province, county, town, village and/or street) and GPS coordinate information (e.g., latitude and longitude) of a region where a disaster has occurred.

In operation 407, the processor 120 may request location information from at least one first external device 210 that interworks with the electronic device 101. For example, the processor 120 may transmit a signal or data that requests the location information of the corresponding first external device to the at least one first external device 210 using the wireless communication module 192.

In operations 409 and 411, the processor 120 may receive a response from the at least one first external device 210 using the wireless communication module 192, in response to the request, and may obtain location information of the at least one first external device 210 included in the response as the second location information. According to various embodiments, similar to the above-described first location information, the second location information may include at least one of name information (e.g., a city, province, county, town, village and/or street) and GPS coordinate information (e.g., latitude and longitude) of a region where the at least one first external device 210 is located.

In operation 413, the processor 120 may determine whether the obtained first location information corresponds to the obtained second location information. In association with the above, if region name information included in the first location information and region name information included in the second location information at least partially match, the processor 120 may determine that the first location information corresponds to the second location information. Alternatively, referring to FIG. 5, if GPS coordinate information (e.g., coordinate B 30) indicated by the second location information falls within a range of radius (R) designated based on GPS coordinate information (e.g., coordinate A 20) indicated by the first location information, the processor 120 may determine that the first location information corresponds to the second location information. According to various embodiments, the designated radius (R) may be set, based on the second external device 220 (e.g., an access point or a base station), to be identical or similar to a range of a distance in which a message transmitted by the second external device 220 is receivable.

If it is determined that the first location information does not correspond to the second location information in operation 413, the processor 120 may monitor (or track) the location of the at least one first external device 210 at designated cycles in operation 415. For example, if the region name information of the second location information obtained from the at least one first external device 210 and the region name information of the first location information obtained from the message to not match, or in the case that, as illustrated in FIG. 5, the GPS coordinate information (e.g., coordinate C 40) of the second location information is beyond the range of radius (R) designated based on the GPS coordinate information (e.g., coordinate A 20) of the first location information, the processor 120 may transmit a signal or data that requests the location information to the at least one first external device 210 at designated cycles, and may receive a response thereto. According to an embodiment, if it is determined that the second location information obtained from the at least one first external device 210 in response to the request corresponds to the first location information obtained from the message, the processor 120 may perform operation 417 described below.

If it is determined that the first location information corresponds to the second location information in operation 413, the processor 120 may produce data indicating a request for checking the message received by the electronic device 101, and may transmit the data to the at least one first external device 210 using the wireless communication module 192 in operations 417 and 419. According to an embodiment, the processor 120 may produce the data to include at least one of text, an image (e.g., video, a still image, a pictogram, and/or a symbol), and a sound indicating that at least one of reception of the message by the electronic device 101 and a request for checking the message via the electronic device 101. Alternatively, the processor 120 may include, in the data, a request for requesting the at least one first external device 210 that receives the data to output a designated pattern of vibration. According to various embodiments, the processor 120 may produce the data including a combination of at least two among the text, the image, the sound, and the request for outputting a designated pattern of vibration.

Figure 6:
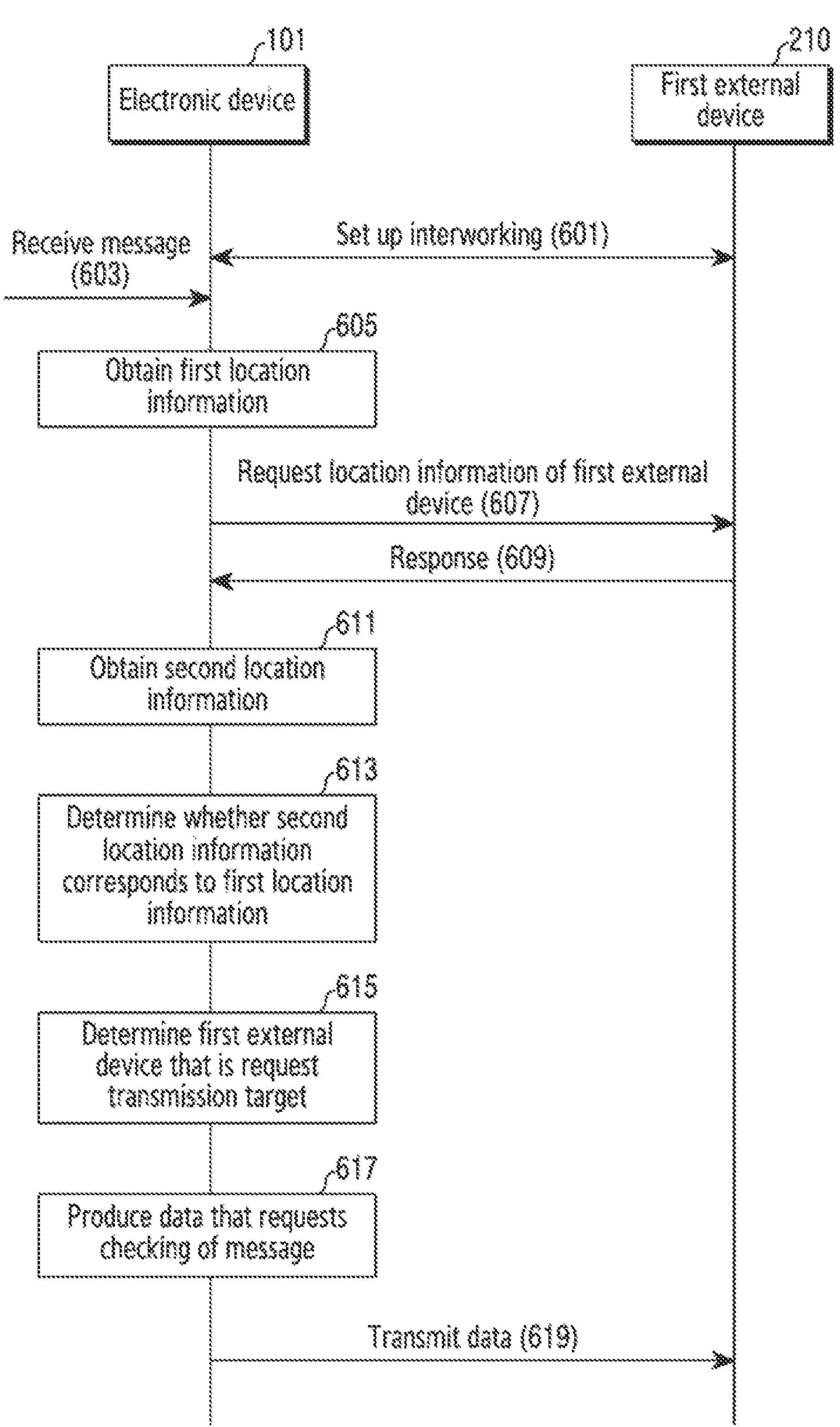
FIG. 6 is a flowchart illustrating operations performed between an electronic device and a first external device, according to another embodiment.

FIG. 6 is a flowchart illustrating operations performed between an electronic device and a first external device according to another embodiment. In an embodiment described with reference to FIG. 6, at least one first external device may include a plurality of first external devices.

Referring to FIG. 6, operation 601, operation 603, operation 605, operation 607, operation 609, operation 611, and operation 613 may respectively correspond to operation 401, operation 403, operation 405, operation 407, operation 409, operation 411, and operation 413 that have been described with reference to FIGS. 4 and 5. For example, a processor (e.g., the processor 120 of FIG. 1) of the electronic device 101 may establish interworking with a plurality of first external devices 210 using a wireless communication module (e.g., the wireless communication module 192 of FIG. 1), and may receive a message including geographical alert information from a second external device (e.g., the second external device 220 of FIG. 2) using the wireless communication module 192. According to an embodiment, if checking of the message by a user is not detected during a designated period of time from the reception of the message, the processor 120 may obtain first location information from the message, and may obtain second location information for each of the plurality of first external devices 210 by requesting location information from each of the plurality of first external devices 210 with which interworking has been established. The processor 120 may determine whether the obtained first location information corresponds to each of the plurality of pieces of second location information.

In operation 615, the processor 120 may determine at least one first external device 210 that is a request transmission target (e.g., a target to which a request for checking a message received by the electronic device 101 is to be transmitted). In association with the above, the processor 120 may determine, as a request transmission target candidate group, at least one first external device 210 that provides the second location information corresponding to the first location information among the plurality of first external devices 210. According to an embodiment, the processor 120 may determine at least one first external device 210 that is the request transmission target that corresponds to a designated priority order in the request transmission target candidate group. In this operation, the processor 120 may obtain operation information associated with the request transmission target candidate group from a server (e.g., a CMC server or a SAMSUNG account server) that supports interworking between the electronic device 101 and the plurality of first external devices 210.

According to an embodiment, the processor 120 may determine, based on the operation information, a group of a designated number of candidates arranged in order of high total frequency of operation as the at least one first external device 210 that is the request transmission target. Alternatively, the processor 120 may determine, based on the operation information, a group of a designated number of candidates arranged in order of latest operation as the at least one first external device 210 that is the request transmission target. Alternatively, the processor 120 may determine, based on the operation information, a group of a designated number of candidates arranged in order of high usable power as the at least one first external device 210 that is the request transmission target.

According to another embodiment, the processor 120 may determine, based on the operation information, a group of all candidates of types that are capable of being worn on a user body as the at least one first external device 210 that is the request transmission target. According to another embodiment, the processor 120 may determine, based on the operation information, a group of all candidates of types that support a designated interface (e.g., a speaker) as the at least one first external device 210 that is the request transmission target. According to another embodiment, the processor 120 may determine, based on the operation information, a group of a designated number of candidates that are latest registered with the electronic device 101 based on user account information, as the at least one first external device 210 that is the request transmission target.

According to various embodiments, the processor 120 may receive a user input for setting the at least one first external device 210 that is the request transmission target via a user interface related to system settings of the electronic device 101. In this instance, the processor 120 may omit determining at least one first external device 210 that is the request transmission target based on the designated priority order, and may determine at least one first external device 210 corresponding to the user input as the at least one first external device 210 that is the request transmission target.

In operation 617 and operation 619, the processor 120 may produce data indicating at least one of reception of the message by the electronic device 101 or a request for checking the message via the electronic device 101, and may transmit the data to at least one first external device 210 determined as the request transmission target using the wireless communication module 192.

Figure 7:
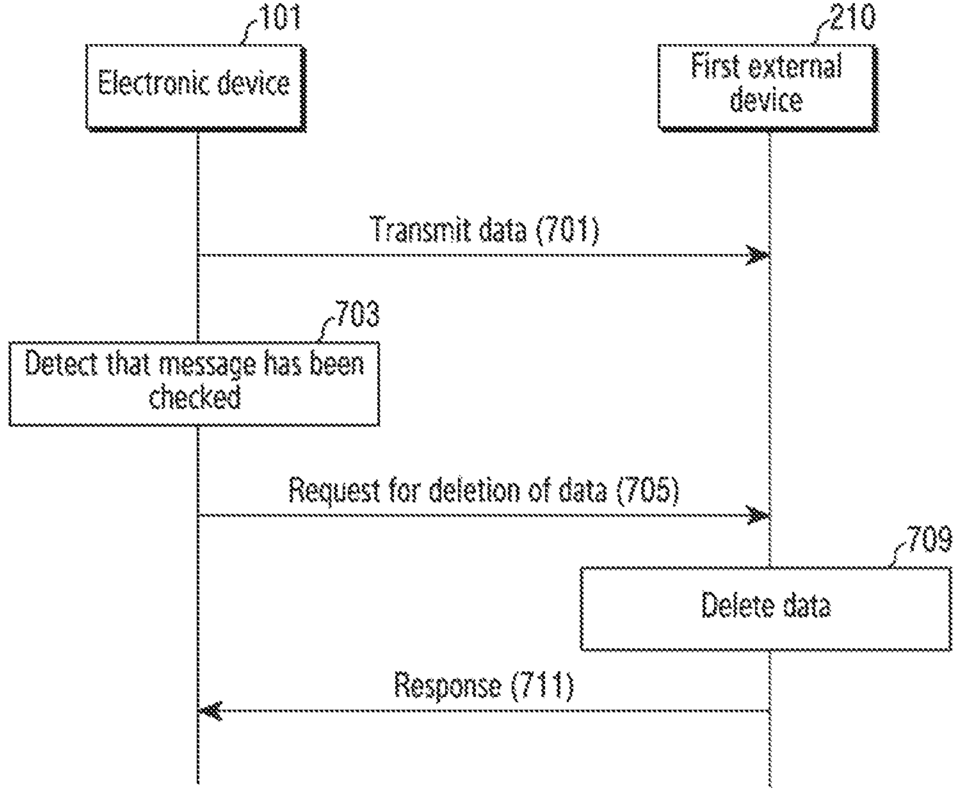
FIG. 7 is a flowchart illustrating operations performed between an electronic device and a first external device, according to another embodiment.

FIG. 7 is a flowchart illustrating operations performed between an electronic device and a first external device according to another embodiment.

Referring to FIG. 7, in operation 701 and operation 703, a processor (e.g., the processor 120 of FIG. 1) of the electronic device 101 may transmit, to the at least one first external device 210, data indicating at least one of reception of a message by the electronic device 101 and a request for checking the message via the electronic device 101, and may detect that a user checks the message via the electronic device 101. In association with the same, the processor 120 may monitor a signal or data output by at least one of a touch sensor, a gyro sensor, an acceleration sensor, a grip sensor, and an approximate sensor included in a sensor module (e.g., the sensor module 176 of FIG. 1) of the electronic device 101 after the transmission of the data. According to an embodiment, if a signal or data output by at least one of the above-described sensors indicates a user input, a user grip, and an approach of an object (e.g., a body part of a user) with respect to the electronic device 101, or indicates a movement of the electronic device 101, the processor 120 may determine that the user has checked the message via the electronic device 101.

In operation 705, the processor 120 may transmit, to the at least one first external device 210, a signal or other data that request deleting the data transmitted to the at least one first external device 210 in response to checking of the message by the user via the electronic device 101. In association with the same, the data that the at least one first external device 210 receives (e.g., data indicating at least one of reception of a message by the electronic device 101 and a request for checking a message via the electronic device 101) is different from the message that the electronic device receives from the second external device (e.g., the second external device 220 of FIG. 2), and thus the message in the electronic device 101 and the data in the at least one first external device 210 may not be synchronized. For example, although the message is deleted from the electronic device 101 since the user has checked the message via the electronic device 101, the data in the at least one external device 210, received from the electronic device 101, may still be present. According to various embodiments, if the message is deleted from the electronic device 101, the processor 120 may transmit a signal or other data that request deletion of the data to the at least one first external device 210, or irrespective of deletion of the message in the electronic device 101, if it is detected that a user has checked the message, the processor 120 may transmit a signal or other data that request deletion of the data to the at least one first external device 210.

In operations 709 and 711, the at least one first external device 210 that receives, from the electronic device 101, a signal or other data that request deletion of the data may delete the data, and may transmit a response thereto to the electronic device 101.

Figure 8:
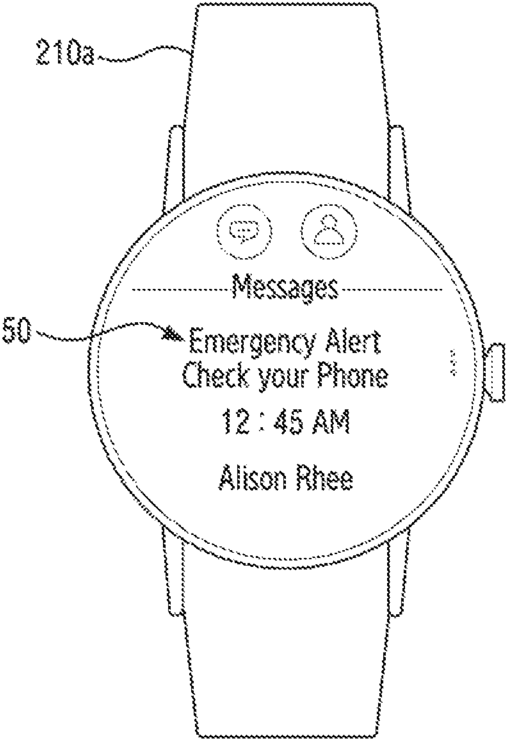
FIG. 8 is a diagram illustrating outputting of data by a first external device, according to an embodiment.
Figure 9:
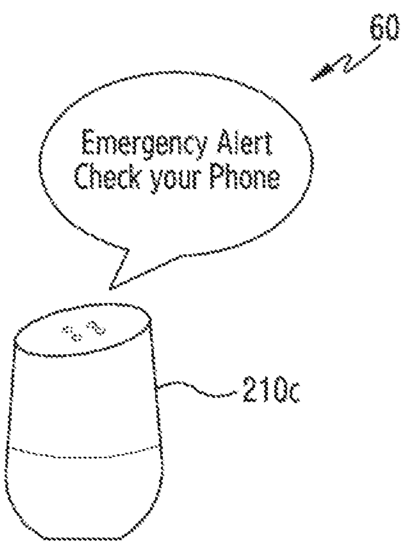
FIG. 9 is a diagram illustrating outputting of data by a first external device, according to another embodiment.

FIG. 8 is a diagram illustrating outputting of data by a first external device according to an embodiment, and FIG. 9 is a diagram illustrating outputting of data by a first external device according to another embodiment.

Referring to FIGS. 8 and 9, an electronic device (e.g., the electronic device 101 of FIG. 2) may produce data including at least one of text, an image (e.g., a video, a still image, a pictogram, and/or a symbol), and a sound indicating that reception of a message (e.g., emergency alert) by the electronic device 101 and a request (e.g., check your phone) for checking a message via the electronic device 101, and may transmit the same to at least one first external device (e.g., the at least one first external device 210_a_, 210_b_, and/or 210_c_ of FIG. 2). According to an embodiment, the at least one first external device 210_a_, 210_b_, and/or 210_c_ may output the data via an interface included in the corresponding first external device in response to reception of the data from the electronic device 101. For example, a first external device (e.g., 210_a_) may output the data in a visual manner via a display, such as displayed message 50. As another example, a first external device (e.g., 210_c_) may output the data sonically via a speaker, such as audible message 60. As another example, the at least one first external device 210_a_, 210_b_, and/or 210_c_ may output the data in a combination of at least two of a visual manner, a auditive manner, and a tactile manner, using at least two of the display, the speaker, and a vibration output device.

An electronic device according to above-described various embodiments may include a wireless communication module and a processor operatively connected to the wireless communication module.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a wireless communication module; and a processor operatively connected to the wireless communication module and configured to:

establish a wireless communication connection for interworking between the electronic device and at least one first external device using the wireless communication module;

receive a message including geographical alert information from a second external device using the wireless communication module;

based on the message being unchecked via the electronic device during a designated period of time from reception of the message, obtain first location information from the message;

request, via the wireless communication connection, second location information of the at least one first external device from the at least one first external device;

obtain the second location information of the at least one first external device in response to the request;

determine whether the second location information corresponds to the first location information;

based on determining that the second location information corresponds to the first location information, generate data indicating a request for checking the message via the electronic device; and transmit, using the wireless communication module, the data to at least one of the at least one first external device.

2. The electronic device of claim 1, wherein the electronic device further comprises a sensor module, and wherein the processor is further configured to:

monitor a signal or data output from the sensor module during the designated period of time; and based on the signal or the data not indicating at least one of a user input, a user grip, and an approach of an object with respect to the electronic device, determine that the message is unchecked via the electronic device.

3. The electronic device of claim 1, wherein the electronic device further comprises a sensor module, and wherein the processor is further configured to:

monitor a signal or data output from the sensor module during the designated period of time; and based on the signal or the data not indicating a movement of the electronic device, determine that the message is unchecked via the electronic device.

4. The electronic device of claim 1, wherein the first location information comprises first name information of a first region related to the geographical alert information, wherein the second location information comprises second name information of a second region in which the at least one first external device is located, and wherein the processor is configured to determine that the second location information corresponds to the first location information based on the first name information and the second name information at least partially matching.

5. The electronic device of claim 1, wherein the first location information comprises global positioning system (GPS) coordinate information related to the geographical alert information, wherein the second location information comprises GPS coordinate information associated with a location of the at least one first external device, and wherein the processor is further configured to determine that the second location information corresponds to the first location information based on the GPS coordinate information included in the second location information falling within a range of radius designated based on the GPS coordinate information included in the first location information.

6. The electronic device of claim 1, wherein the at least one first external device comprises a plurality of first external devices, and wherein the processor is further configured to:

determine a group of at least one data transmission target candidate that provides the second location information corresponding to the first location information among the plurality of first external devices, and determine, based on a designated priority order, the at least one first external device to which the data is to be transmitted in the group of at least one data transmission target candidate.

7. The electronic device of claim 6, wherein the processor is further configured to:

obtain operation information associated with the group of at least one data transmission target candidate from a third external device using the wireless communication module; and determine, based on the operation information, the at least one first external device to which the data is to be transmitted to be one of:

a first group of a first designated number of candidates arranged in order of high total frequency of operation, a second group of a second designated number of candidates arranged in order of latest operation, a third group of a third designated number of candidates arranged in order of high usable power, and a fourth group of a fourth designated number of candidates arranged in order of latest registration with the electronic device based on designated account information.

8. The electronic device of claim 6, wherein the processor is further configured to:

obtain operation information associated with the group of at least one data transmission target candidate from a third external device using the wireless communication module; and determine, based on the operation information, the at least one first external device to which the data is to be transmitted is determined to be one of:

a first group of at least one first candidate of a first type that is capable of being worn on a user body, and a second group of at least one second candidate of a second type that supports operation of a speaker.

9. The electronic device of claim 1, wherein the processor is further configured to:

detect whether the message has been checked via the electronic device, after transmitting the data; and based on detecting that the message has been checked via the electronic device, request deletion of the data from the at least one first external device to which the data has been transmitted.

10. The electronic device of claim 1, wherein the processor is further configured to generate the data using at least one of text, a video, a still image, a pictogram, a symbol, and a sound indicating the request for checking the message via the electronic device.

11. The electronic device of claim 1, wherein the processor is further configured to, based on determining that the second location information does not correspond to the first location information, request the second location information of the at least one first external device from the at least one first external device at designated cycles.

12. A method of transmitting, by an electronic device, a request to an external device, the method comprising:

establishing, using a wireless communication module of the electronic device, a wireless communication connection for interworking between the electronic device and at least one first external device;

receiving a message including geographical alert information from a second external device using the wireless communication module;

based on the message being unchecked via the electronic device during a designated period of time from reception of the message, obtaining first location information from the message;

requesting, via the wireless communication connection, second location information of the at least one first external device from the at least one first external device using the wireless communication module;

obtaining the second location information of the at least one first external device in response to the request;

determining whether the second location information corresponds to the first location information;

based on determining that the second location information corresponds to the first location information, generating data indicating a request for checking the message via the electronic device; and transmitting the data to at least one of the at least one first external device using the wireless communication module.

13. The method of claim 12, wherein the first location information comprises first name information of a first region related to the geographical alert information, wherein the second location information comprises second name information of a second region in which the at least one first external device is located, and wherein the determining whether the second location information corresponds to the first location information comprises, based on the first name information and the second name information at least partially matching, determining that the second location information corresponds to the first location information.

14. The method of claim 12, wherein the first location information comprises global positioning system (GPS) coordinate information related to the geographical alert information, wherein the second location information comprises GPS coordinate information associated with a location of the at least one first external device, and wherein the determining whether the second location information corresponds to the first location information comprises, based on the GPS coordinate information included in the second location information falling within a range of radius designated based on the GPS coordinate information included in the first location information, determining that the second location information corresponds to the first location information.

15. The method of claim 12, wherein the generating data indicating a request for checking the message via the electronic device comprises generating the data using at least one of text, a video, a still image, a pictogram, a symbol, and a sound indicating the request for checking the message via the electronic device.

16. The method of claim 12, wherein the at least one first external device comprises a plurality of first external devices, and wherein the method further comprises:

determining a group of at least one data transmission target candidate that provides the second location information corresponding to the first location information among the plurality of first external devices, and determining, based on a designated priority order, the at least one first external device to which the data is to be transmitted in the group of at least one data transmission target candidate.

17. The method of claim 16, further comprising obtaining, using the wireless communication module, operation information associated with the group of at least one data transmission target candidate from a third external device, wherein the determining the at least one first external device to which the data is to be transmitted comprises determining, based on the operation information, the at least one first external device to which the data is to be transmitted to be one of:

a first group of a first designated number of candidates arranged in order of high total frequency of operation, a second group of a second designated number of candidates arranged in order of latest operation, a third group of a third designated number of candidates arranged in order of high usable power, and a fourth group of a fourth designated number of candidates arranged in order of latest registration with the electronic device based on designated account information.

18. The method of claim 16, further comprising obtaining, using the wireless communication module, operation information associated with the group of at least one data transmission target candidate from a third external device, and wherein the determining the at least one first external device to which the data is to be transmitted comprises determining, based on the operation information, the at least one first external device to which the data is to be transmitted to be one of:

a first group of at least one first candidate of a first type that is capable of being worn on a user body, and a second group of at least one second candidate of a second type that supports operation of a speaker.

19. The method of claim 12, further comprising:

detecting whether the message has been checked via the electronic device, after the transmitting the data; and based on detecting that the message has been checked via the electronic device, requesting deletion of the data from the at least one first external device to which the data has been transmitted.

* * * * *